Sept. 6, 1932.  L. SUVERKROP  1,875,830
SURVEYING INSTRUMENT
Filed Dec. 5, 1929
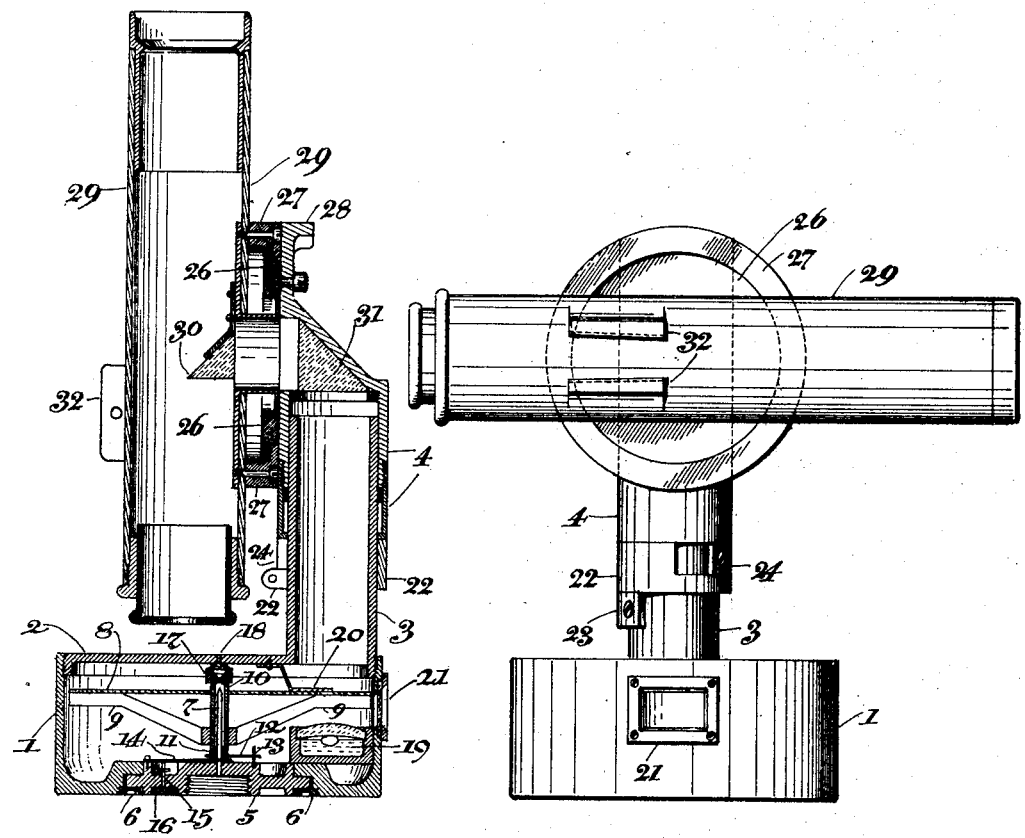
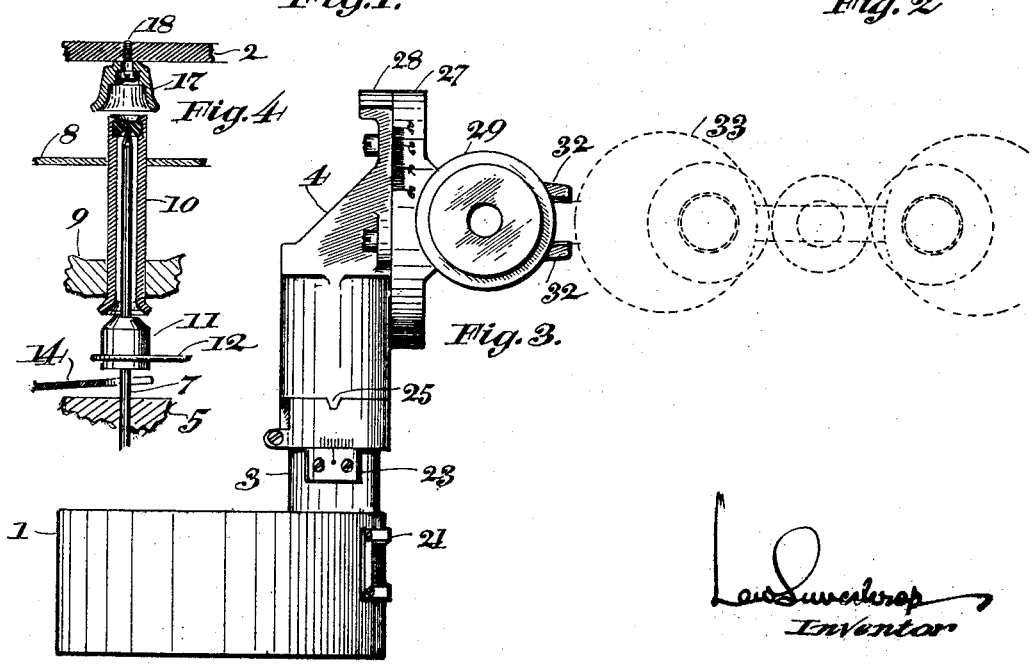

Patented Sept. 6, 1932

1,875,830

UNITED STATES PATENT OFFICE

LEW SUVERKROP, OF BAKERSFIELD, CALIFORNIA

SURVEYING INSTRUMENT

Application filed December 5, 1929. Serial No. 411,726.

This invention relates especially to certain improvements in surveying instruments and more particularly of the character of a theodolite, including the class known as hand transits or compasses, and it is an object of the invention to provide a novel instrument of this sort whereby horizontal and vertical angles may be quickly and accurately determined.

A further object of the invention is to combine the "plate circle" and compass circle of this class of instruments, thereby effecting a simplified and compact construction by means of which one may either turn off horizontal angles or determine magnetic bearings.

A further object of the invention is to bring into the line of sight of the observer on an object a view of the object, the horizontal angle or bearing reading, and the level by means of which the observer may know when the "vertical axis" of the instrument is vertical.

A further object of the instrument is to provide a simple and compact device for quickly and accurately determining horizontal and vertical angles, which may be attached to a telescope, binoculars or other sighting device, the combination of which forms a useful instrument of the class named.

Other advantages and objects will be apparent from the following description when taken in connection with the accompanying drawing, in which:

Figure 1 is a vertical section through the instrument in its "folded" position.

Figure 2 is a side elevation of the instrument when "opened" and ready for use.

Figure 3 is an elevation showing the eyepiece end of the instrument when "opened" ready for use.

Figure 4 is an enlarged cross-sectional view of the spindle and related parts of the instrument.

As disclosed in the accompanying drawing, numeral 1 indicates a case forming the body of the instrument which is fitted with a cover 2. The cover 2 has a hollow projecting tube 3. The head 4 is mounted so that it may be moved on the tube 3. At the bottom of the case 1 is a plate 5 retained by the ring 6. The plate may have means for attachment to a Jacob's staff or like support. The axis of the plate 5 is preferably the same as the axis of the case 1 and the spindle 7 is fixed to the plate 5 in this axis. A transparent disc 8 and magnetic compass needle 9 are mounted on a staff 10 which rests on the spindle 7. The lower end of the staff 10 is made to receive the upper end of the clutch piece 11 which is free to slide along the spindle 7 but which is fixed against turning by the arm 12 held by the pin 13 mounted in the plate 5. The clutch piece 11 is actuated along the spindle 7 through the arm 14 by the pin 15 moved either by the finger direct or retained in position by the slide 16. The upper end of the staff 10 is made to be received within the bowl-shaped lower end of the centering bearing 17 which is free to rotate about the shoulder screw 18. The axis of the shoulder screw 18 is the same as that of the spindle 7. Having its axis in line with the tube 3 is the level 19 fixed to the case 1. A transparent vernier piece 20 is fitted to the case. The disc 8 is marked with degrees and the transparent vernier plate 20 is marked to correspond thereto. A window 21 permits light to enter the case.

The tube 3 is fitted with an adjustable declination ring 22, a fixed declination vernier 23, and a fixed holding plate 24. Both the declination ring 22 and the holding plate 24 have slots to receive the single tooth 25 which is on the head 4. The tooth 25 fits into the slot in the holding plate 24 when the instrument is folded. The tooth 25 fits into the slot in the declination ring 22 when the instrument is opened for use, the declination ring having been adjusted against the vernier 23 so that a sight through the instrument will be referred to a true north rather than magnetic north.

The head 4 carries the ring 26 which retains the vertical circle 27 whose perifery meets a vernier 28 formed by a projection on the head 4. The vertical circle 27 is free to turn about on the head 4 and holds the sighting tube 29 and the prism or mirror 30. Ordinary telescope lenses and reticules may be mounted within the sight tube 29. A second prism 31 is mounted in the head 4. By means of these prisms or mirrors, 30 and 31, a view of the compass disc 8 and level 19 may be had by the eye placed at the sight tube 29, regardless of the position of the head 4 around the vertical axis of the tube 3 or the sight tube 29 around the horizontal axis of the head 4. The tube 3 may be fitted with lenses to facilitate viewing the disc 8 and level 19.

Mounting lugs 32 may be fitted for applying the instrument to a separate telescope or pair of binoculars as indicated at 33 in which case the sight tube mirror or prism 30 may extend across the entire tube 29.

To "open" the instrument for use, the head 4 is moved upward with respect to the case 1 so that the tooth 25 disengages the slot in the holding plate 24. The head is then turned on the tube 3 and the tooth 25 is brought into engagement with the slot in the declination ring 22. In taking a sight, the sight tube 29 is held in the right hand and the case 1 is held in the left hand, while the eye is placed at the sight tube. The sight tube 29 is brought to bear on the object and the case 1 is moved until the observer sees by the level 19 that the vertical axis of the instrument is vertical. The azimuth of the line of sight may then be read while the instrument is held in position. To turn an angle, the slide 16 is moved so as to bring the clutch piece 11 into engagement with the spindle 10, pushing the latter into the centering bearing 17. The instrument is then mounted on a Jacob's staff or other support at the plate 5. The instrument is leveled, the sight taken and the angle read, the vernier 20 facilating the reading of the angle. The case of the instrument 1 is turned on the base 5 and the second sight taken and the angle read. The angle turned is obtained by subtraction. In either case, the vertical angle is obtained by reading the vertical circle 27 referred to the vernier 28.

In accordance with the patent statutes I have described what I now believe to be the preferred embodiments of the invention; but inasmuch as various minor changes may be made in the details of construction without departing from the spirit of the invention, it is intended that all such changes be included within the scope of the appended claims.

Having fully described my invention, what I claim as new and desire to secure by Letters Patent is:

1. In an instrument of the class described, a sight tube, a casing containing a compass and level, means for connecting said sight tube and casing comprising a straight vertical hollow tube, fastened to said casing at one end and an optical system located at the other end of said hollow tube for producing and transmitting images of said compass and level to said sight tube.

2. In an instrument of the class described, a casing containing a level, means for admitting light into said casing, a hollow tube connected to said casing directly over the level and extending upwardly therefrom, a sighting tube for viewing a distant object pivotally connected to the top of said tube on a horizontal axis, said hollow tube being in ocular communication with said sight tube and means including a prism at the top of said hollow tube for producing and transmitting images of said level to the field of view of the observer while viewing an object.

3. An instrument according to claim 2 in which said pivotal connection includes a graduated circle on said sight tube and a vernier on said hollow tube.

4. An instrument according to claim 2 in which said casing is closed except within the area of the hollow tube and in which a window is provided in said casing.

5. An instrument according to claim 2 in which said casing also contains a graduated disc and means on the bottom of said casing for fastening it to a Jacob's staff or like support.

6. An instrument according to claim 2 in which there is also a compass within said casing, and positioned so that it can be read simultaneously with the level.

7. An instrument according to claim 2 in which said casing also contains a compass card formed of transparent material, and said level is disposed below said compass card.

8. An instrument of the class described comprising a casing containing a compass and a level, a hollow tube connected to said casing directly over said level and extending upwardly therefrom, a sighting tube, for viewing a distant object, pivotally connected to the top of said tube on a vertical axis and means including a prism at the top of said hollow tube for producing and transmitting images of said compass and level to the field of view of the observer while viewing an object.

9. In an instrument of the class described, a telescope, a sighting tube connected in parallel relation to said telescope, a compass and level mounted in a casing and connected to said sighting tube by means of a hollow tube, and means including a prism at the top of said tube for producing and transmitting images of said compass and level to the field of view of an observer using said sighting tube.

10. In an instrument of the class described a casing containing a compass and level, a sighting tube, a short hollow tube extending from one side of said sighting tube, a longer hollow tube extending at right angles to said short tube, one end of said longer tube being connected to said casing, said short and longer tubes being adapted to receive the rays reflected by the compass and level, and means including a prism between said short and longer tubes for projecting the rays of light from the compass and level through the ocular tube.

11. An instrument according to claim 10 in which said prism is mounted to turn with respect to said longer tube on a vertical axis and to turn with respect to said short tube on a horizontal axis.

12. An instrument of the class described, comprising in combination a casing having a level therein, a tube secured to said casing, a sighting tube, means for movably connecting said sighting tube to the end of said first tube comprising a head pivotally connected to said first tube to rotate on the axis of said first tube and pivotally connected to said sighting tube to rotate on an axis at right angles to said first mentioned axis, and means for producing and transmitting images of the level to the field of view of the observer while viewing an object thru said sighting tube.

13. An instrument according to claim 12 in which said last mentioned means includes a prism at the end of said first tube and a second prism within said sighting tube.

14. An instrument according to claim 12 in which said first tube has an adjustable declination ring and a fixed holding ring, both said rings having slots, a tooth on said head receivable in either slot at will.

15. In an instrument of the class described, a casing containing a compass and level, a sight tube and means for simultaneously producing and transmitting images of said compass and level to the eye of an observer at said sight tube comprising a hollow tube mounted at one end on said casing at right angles to the compass and in a plane parallel to the plane of the sight tube and connected at its other end to said sight tube.

16. An instrument of the class described comprising a closed casing, a compass and level enclosed in said casing, a hollow tube connected to said casing and a sighting tube for viewing a distant object connected to said hollow tube, and means in both said tubes for producing and transmitting images of said compass and level to the field of view of the observer while viewing an object.

LEW SUVERKROP.